UNITED STATES PATENT OFFICE.

LUCAS PETROU KYRIDES, OF NEW YORK, N. Y., ASSIGNOR TO GENERAL CHEMICAL COMPANY, OF NEW YORK, N. Y., A CORPORATION OF NEW YORK.

PROCESS OF PRODUCING HALOGENATED HOMOLOGUES OF BENZENE.

1,345,373. Specification of Letters Patent. Patented July 6, 1920.

No Drawing. Application filed July 26, 1917. Serial No. 182,873.

*To all whom it may concern:*

Be it known that I, LUCAS PETROU KYRIDES, formerly known as LUCAS PETROU KYRIAKIDES, residing at No. 403 West 115th street, borough of Manhattan, city, county, and State of New York, have invented certain new and useful Improvements in Processes of Producing Halogenated Homologues of Benzene, of which the following is a specification.

My invention relates in general to a process for the production of side chain halogen substitution products of toluene, such as benzyl chlorid, benzal chlorid and benzotrichlorid formed by replacing one or more hydrogen atoms of the methyl group by a halogen; and of such other side chain aromatic hydrocarbons to which the process may be applicable.

Heretofore these substances have generally been prepared either by the action of chlorin on boiling toluene or by the action of chlorin on toluene in the presence of a catalyst. Toluene is an aromatic hydrocarbon having a benzene nucleus and a side chain methyl group. This methyl group does not lend itself readily to halogenation and hence prolonged action is required to accomplish the chlorination when the treatment is carried out without the catalyst, particularly in the case of benzal chlorid and benzotrichlorid. In order to accelerate the chlorination, small amounts of phosphorus trichlorid and phosphorus penta-chlorid have been tried. These substances are objectionable, however, as they are not only comparatively expenssive; disagreeable, if not dangerous to handle; but tend to decompose on exposure to moist air.

I have discovered that instead of using the dangerous and expensive catalysts above referred to, I may employ sulfur or sulfur chlorid. I have discovered also that if I add acetyl chlorid to the materials, above referred to when chlorinating the toluene, I obtain an accelerated reaction and a product equal with respect to purity and economy of production to that heretofore obtained by the methods employed in the prior art.

The following examples are illustrative of the principles of my invention and it will be readily apparent that various modifications may be made in the details thereof without departing from the spirit and scope of the appended claims.

Example I.

To 150 parts by weight of dry toluene of commerce contained in a suitable vessel preferably of glass and provided with a return condenser, I add 3 parts by weight of sulfur chlorid. I heat the mixture to 90° C. and add by means of a suitable distributer 75 parts by weight of dry chlorin in gaseous form. When the chlorin has all been added a liquid is obtained which contains about 100 parts by weight of benzyl chlorid most of which can then be recovered in a pure state by any suitable method of the usual and well known description. The addition of 3 parts by weight of acetyl chlorid to the mixture of toluene and sulfur chlorid improves the yield and quality of the product.

Example II.

To 225 parts by weight of dry toluene of commerce contained in a suitable vessel, preferably of glass and provided with a return condenser, I add 4½ parts by weight of sulfur chlorid and 4 parts by weight of acetyl chlorid. I heat this mixture to a temperature of 100° C. and rapidly pass therethrough a stream of dry chlorin gas by means of a suitable distributer. While the chlorin is being added I gradually raise the temperature of the mixture to 180° C. When the liquid has attained a specific gravity of 1.272 Bé. the operation is discontinued. The liquid then contains about 245 parts by weight of benzal chlorid, most of which can be recovered in a pure state by any suitable method of the usual and well known description.

Example III.

To 90 parts by weight of dry toluene of commerce contained in a suitable vessel, preferably of glass and provided with a return condenser, I add 2 parts of acetyl chlorid and $\tfrac{9}{10}$ of one part by weight of sulfur. I heat this mixture to a temperature of 100° C. and rapidly pass therethrough a stream of dry chlorin gas by means of a suitable distributer. While adding the chlorin I gradually raise the temperature and when the liquid has acquired a specific gravity of 1.315 Bé. the operation is discontinued. The liquid now contains about 100 parts of benzotrichlorid and 50 parts benzal chlorid, most of which can be isolated in a pure state by any suitable method of the usual and well known description.

In each of the three examples above referred to, I can add instead of the sulfur chlorid, referred to, the equivalent amount of sulfur and obtain the same results.

I prefer to use the ground sulfur in preference to the sulfur chlorid as being more easily handled, since sulfur and the sulfur chlorid appear to be equivalent materials when used as described. In the above process acetyl chlorid acts as a drying agent although it may possibly have other functions which I am at present not aware of. Hence when I speak in my claims of acetyl chlorid I mean to include equivalent materials which are capable of acting as a drying agent in a manner similar to that in which acetyl chlorid acts. When I speak in my claims of sulfur chlorid I mean to include the use of sulfur instead of sulfur chlorid as a starting material, and when I speak of halogen or a side chain aromatic hydrocarbon, I do not mean to include any such as may not be suitable. When I speak in my claims of toluene I mean to include, as chemically equivalent to toluene, any other side chain aromatic hydrocarbon to which the process may be applied for the production of a side chain halogen substitution product.

I claim:

1. The process which comprises maintaining toluene in reactive relation with chlorin in the presence of sulfur chlorid substantially as and for the purpose described.

2. The process which comprises maintaining toluene in reactive relation with chlorin in the presence of sulfur chlorid and acetyl chlorid substantially as and for the purpose described.

3. The process which comprises maintaining toluene in reactive relation with chlorin in the presence of sulfur chlorid until a product is obtained in which benzyl chlorid predominates substantially as and for the purpose described.

4. The process which comprises maintaining toluene in reactive relation with chlorin in the presence of sulfur chlorid until a product is obtained in which benzyl chlorid predominates and then further maintaining the substances in reactive relation until a product is obtained in which benzal chlorid predominates, substantially as and for the purpose described.

5. The process which comprises maintaining toluene in reactive relation with chlorin in the presence of sulfur chlorid until a product is obtained in which benzyl chlorid predominates and then further maintaining the substances in reactive relation until a product is obtained in which benzal chlorid predominates and then further continuing the substances in reactive relation until a product is formed in which benzotrichlorid predominates substantially as and for the purpose described.

6. The process which comprises maintaining toluene in reactive relation with chlorin in the presence of sulfur chlorid and acetyl chlorid until a product is obtained in which benzyl chlorid predominates substantially as and for the purpose described.

In testimony whereof I have hereunto set my hand.

LUCAS PETROU KYRIDES.